(12) United States Patent
Takami

(10) Patent No.: US 9,936,146 B2
(45) Date of Patent: Apr. 3, 2018

(54) IMAGING SYSTEM WHICH CORRECTS WHITE BALANCE OF IMAGES

(71) Applicant: JVC KENWOOD Corporation, Yokohama-shi, Kanagawa (JP)

(72) Inventor: Etsuya Takami, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/262,460

(22) Filed: Sep. 12, 2016

(65) Prior Publication Data

US 2016/0381303 A1 Dec. 29, 2016

Related U.S. Application Data

(63) Continuation of application No. PCT/JP2015/084649, filed on Dec. 10, 2015.

(30) Foreign Application Priority Data

Dec. 26, 2014 (JP) .................................. 2014-264621

(51) Int. Cl.
*H04N 9/73* (2006.01)
*H04N 5/265* (2006.01)
(Continued)

(52) U.S. Cl.
CPC ......... *H04N 5/265* (2013.01); *H04N 5/23238* (2013.01); *H04N 5/247* (2013.01);
(Continued)

(58) Field of Classification Search
CPC ........ H04N 1/6077; H04N 1/60; H04N 1/608; H04N 13/0025; H04N 9/735; G06T 2207/10024; G09G 2320/0666
(Continued)

(56) References Cited

U.S. PATENT DOCUMENTS 8,872,936 B2 * 10/2014 Ichikawa ............. H04N 5/2355
348/223.1
9,628,768 B2 * 4/2017 Kikuchi ................. H04N 5/265
(Continued)

FOREIGN PATENT DOCUMENTS

JP 2007096767 A 4/2007

OTHER PUBLICATIONS

International Search Report dated Jan. 19, 2016 corresponding to International application No. PCT/JP2015/084649.
(Continued)

*Primary Examiner* — Ngoc-Yen Vu
(74) *Attorney, Agent, or Firm* — Nath, Goldberg & Meyer; Jerald L. Meyer

(57) ABSTRACT

An imaging system includes: plural imaging devices which are mounted on the same moving body, and configured to capture subjects to acquire images; and a controller configured to calculate a target white balance value common to the images acquired by the imaging devices. Each imaging device includes: a white balance calculator configured to calculate an individual white balance value of the image acquired by the imaging device; and a white balance corrector configured to correct the individual white value of the image of the subject taken by the imaging device to the target white balance value. The controller includes a weighting unit configured to individually weight the individual white balance value given from each imaging device.

5 Claims, 10 Drawing Sheets

(51) Int. Cl.
    *H04N 9/04*     (2006.01)
    *H04N 5/247*     (2006.01)
    *H04N 7/18*     (2006.01)
    *H04N 5/232*     (2006.01)
    *H04N 5/228*     (2006.01)

(52) U.S. Cl.
    CPC ............... *H04N 7/181* (2013.01); *H04N 9/04* (2013.01); *H04N 9/735* (2013.01)

(58) Field of Classification Search
    USPC ........................................ 348/223.1; 358/516
    See application file for complete search history.

(56) References Cited

U.S. PATENT DOCUMENTS

| | | | |
|---|---|---|---|
| 9,769,381 B2* | 9/2017 | Lu | H04N 5/23238 |
| 2002/0196340 A1 | 12/2002 | Kato et al. | |
| 2007/0285282 A1 | 12/2007 | Nakayama et al. | |
| 2009/0147100 A1 | 6/2009 | Nagamasa et al. | |
| 2016/0182874 A1* | 6/2016 | Richards | H04N 9/735 348/187 |
| 2016/0269597 A1* | 9/2016 | Kanatani | H04N 5/2351 |

OTHER PUBLICATIONS

European search report dated Nov. 22, 2017 for corresponding EP application 15872735.4.

* cited by examiner

FIG. 10A

|        | LEFT | CENTER | RIGHT |
|--------|------|--------|-------|
| FRONT  | 1    | 1      | 1     |
| MIDDLE | 1    | 1      | 1     |
| REAR   | 1    | 1      | 1     |

FIG. 10B

|        | LEFT | CENTER | RIGHT |
|--------|------|--------|-------|
| FRONT  | 2    | 3      | 2     |
| MIDDLE | 1    | 2      | 1     |
| REAR   | 1    | 1      | 1     |

FIG. 10C

|        | LEFT | CENTER | RIGHT |
|--------|------|--------|-------|
| FRONT  | 2    | 4      | 2     |
| MIDDLE | 1    | 2      | 1     |
| REAR   | 1    | 1      | 1     |

FIG. 10D

|        | LEFT | CENTER | RIGHT |
|--------|------|--------|-------|
| FRONT  | 4    | 8      | 4     |
| MIDDLE | 2    | 4      | 2     |
| REAR   | 1    | 1      | 1     |

IMAGING SYSTEM WHICH CORRECTS WHITE BALANCE OF IMAGES

CROSS REFERENCE TO RELATED APPLICATION

This application is a Continuation of PCT Application No. PCT/JP2015/084649, filed on Dec. 10, 2015, and claims the priority of Japanese Patent Application No. 2014-264621, filed on Dec. 26, 2014, the entire contents of both of which are incorporated herein by reference.

BACKGROUND

The present disclosure relates to an imaging system which corrects the white balance of images of subjects taken by plural imaging devices.

This type of techniques includes a known technique described in Japanese Unexamined Patent Application Publication No. 2007-96767 (Patent Literature 1). Patent Literature 1 describes a camera system which adjusts the white balance of plural imaging cameras for television broadcasting.

In this camera system, white balance information obtained by imaging a white subject with the imaging cameras is averaged. The averaged white balance information is sent to all the imaging cameras. Each imaging camera adjusts the white balance based on the averaged white balance information.

SUMMARY

When plural imaging cameras are installed at different places on a moving body, subjects' images taken by the imaging cameras may vary frequently and significantly in brightness and the like.

In such a case, the technique employed by the conventional camera system only averages the white balance information of each imaging camera, and does not take consideration of the properties of each camera. It is therefore difficult for the conventional camera system to optimally equalize the white balance of images of subjects taken by each imaging camera.

An aspect of the embodiments provides an imaging system, including: a plurality of imaging devices which are mounted on a same moving body, and configured to capture subjects to acquire images; and a controller configured to calculate a common target white balance value to the images acquired by the imaging devices, wherein each of the plurality of imaging devices includes: a white balance calculator configured to calculate an individual white balance value of an image acquired by the imaging device; and a white balance corrector configured to correct the individual white balance value of the image of the subject taken by the imaging device to the target white balance value, and the controller includes: a weighting unit configured to individually weight the individual white balance value given from each of the plurality of imaging devices, based on a weighting coefficient set for each of the plurality of imaging devices, and an average calculator configured to calculate the average of the weighted individual white balance values, and set the target white balance value to the calculated average.

BRIEF DESCRIPTION OF THE DRAWINGS

FIGS. 10A-10D illustrate tables showing examples of specific numerical values of weighting coefficients for the white balance values of images taken by imaging devices installed in nine sections illustrated in FIG. 9.

DETAILED DESCRIPTION

Hereinafter, a description is given of at least one embodiment using the drawings.

Embodiment

Figure 1:
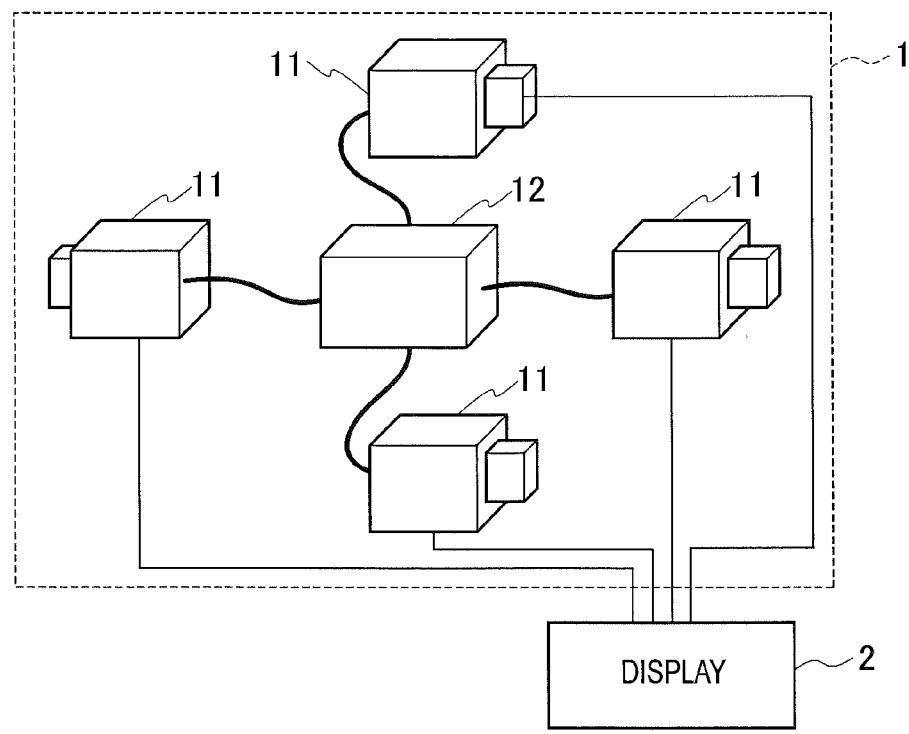
FIG. 1 is a diagram illustrating an example of the entire configuration of an imaging system according to at least one embodiment.

First, with reference to FIG. 1, the entire configuration of an imaging system according to the embodiment is described.

An imaging system 1 includes the plural imaging devices 11 and a controller 12. The imaging system 1 is configured to include four imaging devices 11, commonly connected to one controller 12, for example. The imaging devices 11 are mounted on the same moving body, for example, a vehicle, a ship, an air vehicle, and capture subjects to obtain image data.

In the embodiment described below, a description is given of a case where the plural imaging devices 11 and the controller 12 are mounted on a vehicle as an example. Vehicles described below are vehicles with the imaging system 1 mounted thereon.

In the system configuration illustrated in FIG. 1, the controller 12 is provided as a different body from the plural imaging devices 11. However, the controller 12 may be provided within one of the plural imaging devices 11 to be integrated with the imaging device 11.

Each imaging device 11 and each controller 12 exchange necessary information through wired or wireless communication.

The imaging system 1 calculates a target white balance value common to each imaging device 11, and corrects according to the target white balance value, individual white balance values individually calculated by the imaging devices 11. Images taken by the imaging devices 11 and corrected to the target white balance value can be properly combined and displayed on the display 2, which is connected to the imaging devices 11. That is, when displaying plural images taken by the imaging devices 11 on the display 2, the white balance values of plural images to be displayed are equalized to the target white balance value.

Figure 2:
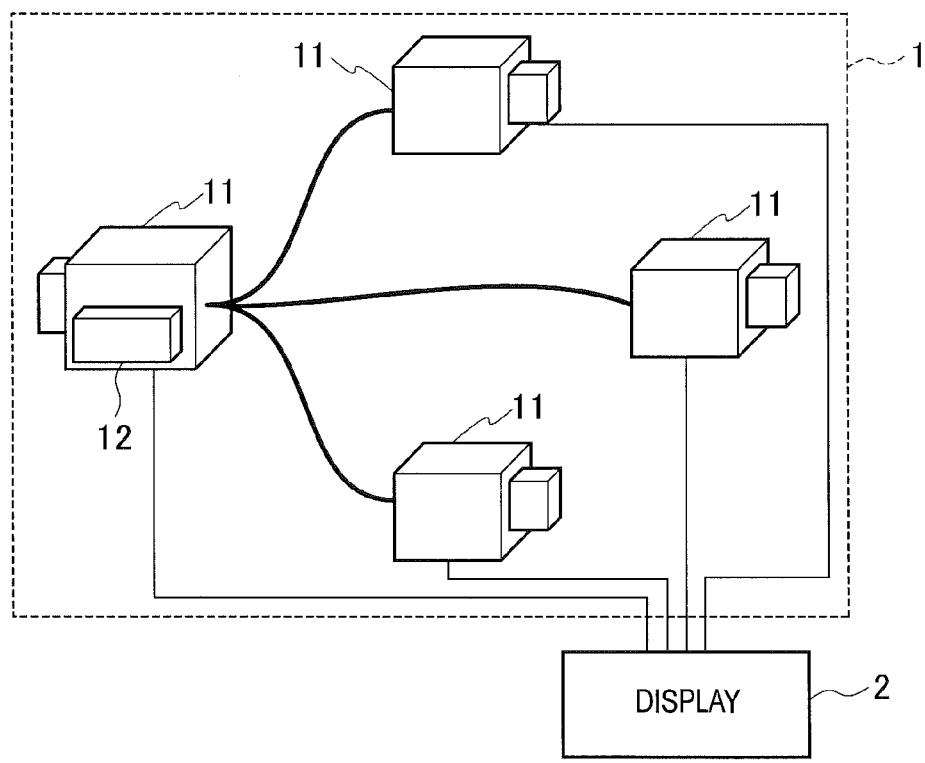
FIG. 2 is a diagram illustrating another example of the entire configuration of the imaging system according to the embodiment.

FIGS. 1 and 2 illustrate only one display 2. However, plural display 2 may be used.

Figure 3:
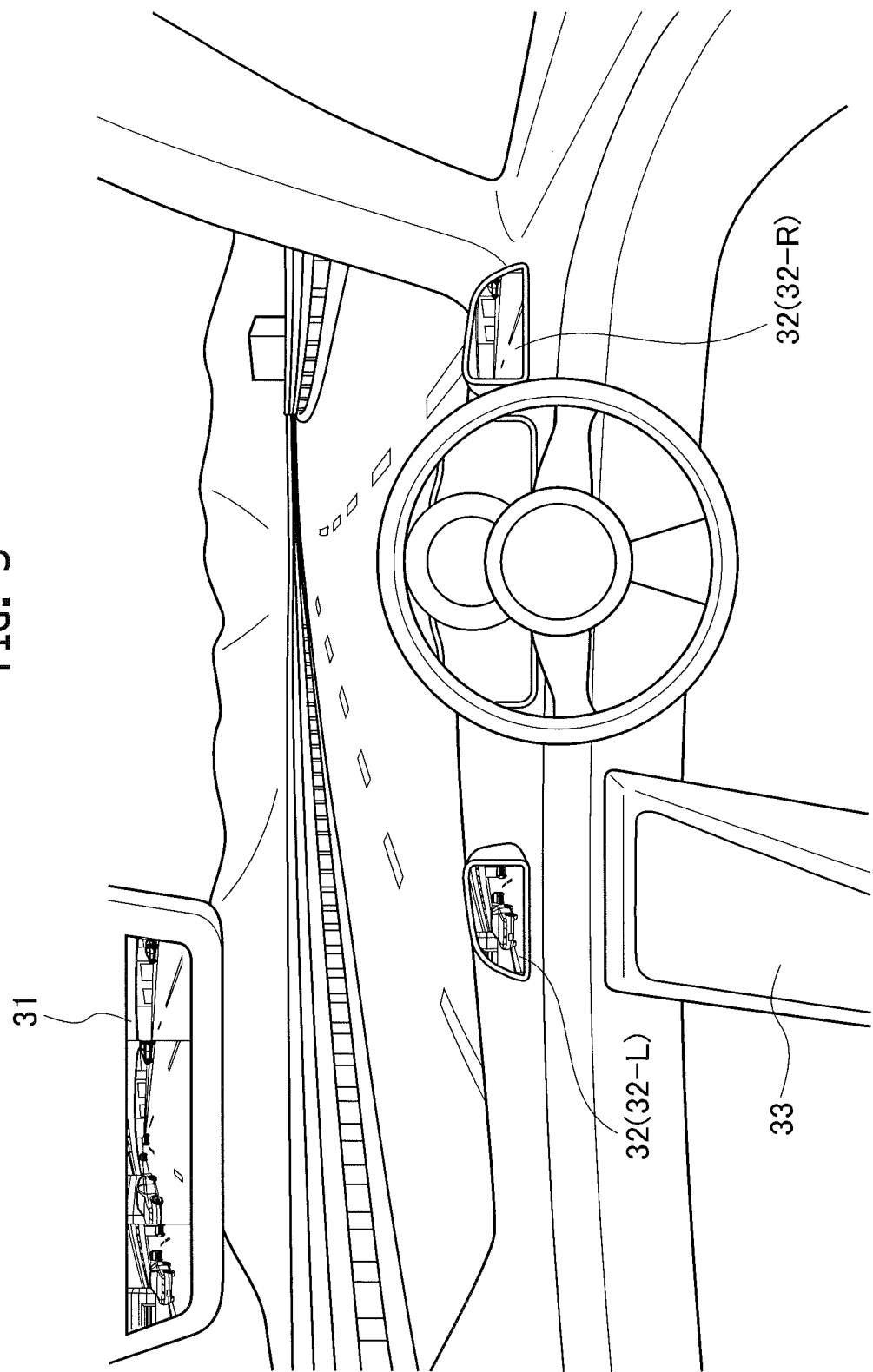
FIG. 3 is a diagram schematically illustrating the area around a driver's seat in a vehicle provided with a display as an example configured to display images obtained by the imaging system according to the embodiment.

FIG. 3 is a diagram schematically illustrating the area around the driver's seat in the vehicle.

As illustrated in FIG. 3, the display 2 includes a digital rearview mirror 31 and digital side mirrors 32 (32-L, 32-R), each composed of a liquid crystal display to display images taken by the imaging devices 11. The display 2 includes a navigation display 33 that is composed of a liquid crystal display as illustrated in FIG. 3, for example. The navigation display 33 displays map information and the like in a navigation system.

The display 2 includes a head-up display, a cluster display, and the like, that are not illustrated in FIG. 3, for example. The head-up display is configured to display images on the front windshield. The cluster display is located adjacent to the indicators provided in the dashboard, and displays an image of the area around the vehicle.

The display 2 is not limited to the device described above and may have any configuration if the display 2 is capable of displaying images taken by the imaging devices 11.

Figure 4:
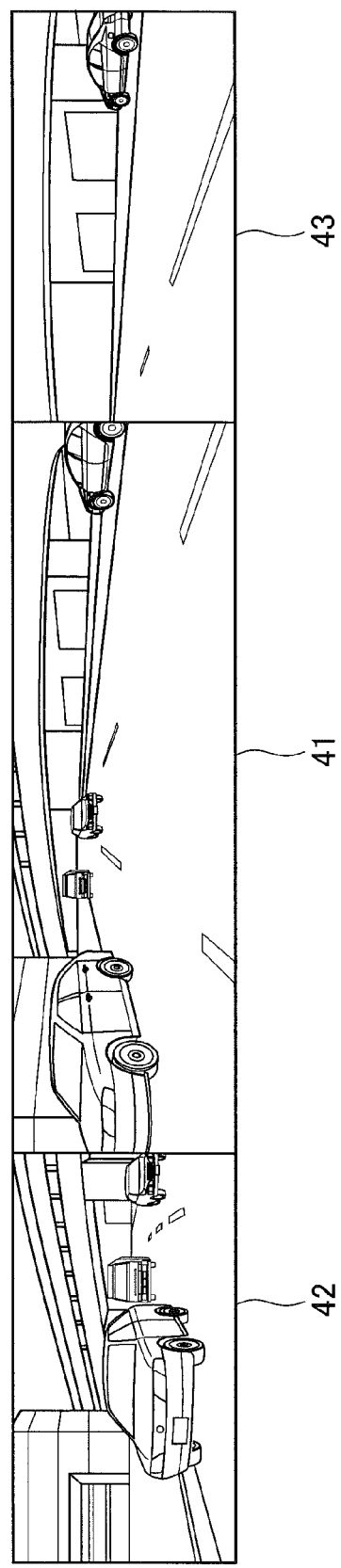
FIG. 4 is a diagram illustrating a display example displayed on one display in which images taken by plural imaging devices are displayed.

FIG. 4 is a diagram illustrating an example of images displayed on the digital rearview mirror 31.

In FIG. 4, an image 41 of the rearward view from the vehicle is displayed at the center of the digital rearview mirror 31. In the digital rearview mirror 31, an image 42 of left-hand rearward view of the vehicle is displayed to the left next to the image 41. In the digital rearview mirror 31, an image 43 of the right-hand rearward view from the vehicle is displayed to the right next to the image 41.

Figure 5:
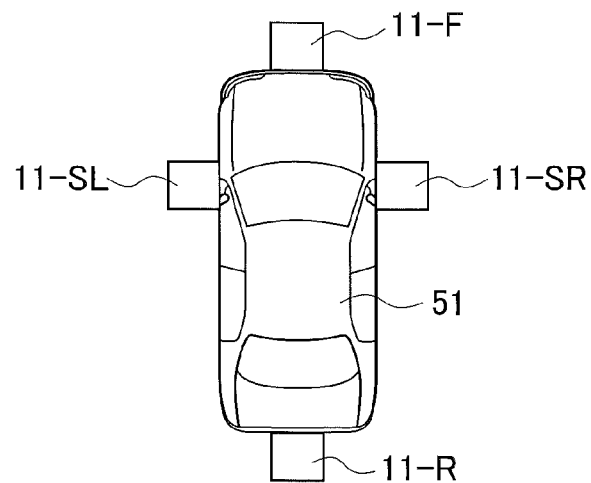
FIG. 5 is a diagram illustrating an example of positions of imaging devices installed on a vehicle.

FIG. 5 is a diagram illustrating an example of the installation position of each imaging device 11 in a vehicle 51 when the imaging system 1 includes four imaging devices 11, for example. Each imaging device 11 can be located at any position not limited to the installation positions illustrated in FIG. 5.

The image 41 displayed on the digital rearview mirror 31 is an image taken by the imaging device 11-R, installed in the back of the vehicle 51 as illustrated in FIG. 5. The image 42 displayed on the digital rearview mirror 31 is an image taken by the imaging device 11-SL, installed on a door mirror in the left side of the vehicle 51 as illustrated in FIG. 5. The image 43 displayed on the digital rearview mirror 31 is an image taken by the imaging device 11-SR, installed on a door mirror in the right side of the vehicle 51 as illustrated in FIG. 5.

The left digital side mirror 32-L displays an image taken by the imaging device 11-SL, for example, and the right digital side mirror 32-R displays an image taken by the imaging device 11-SR, for example.

Figure 6:
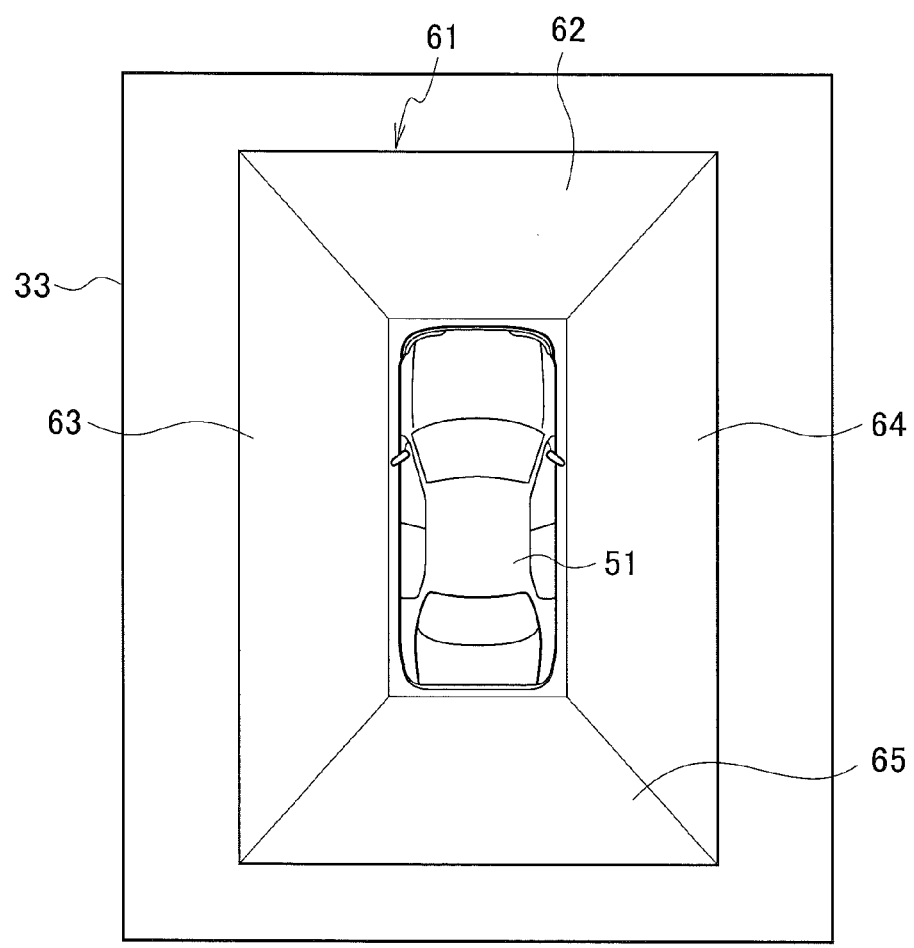
FIG. 6 is a diagram illustrating a display example in which images taken by plural imaging devices are combined and displayed on a display.

FIG. 6 illustrates an example of the image displayed on the navigation display 33. In FIG. 6, the navigation display 33 displays an overhead view image 61 around the vehicle 51 including the vehicle 51, generated by combining images taken by plural imaging devices installed at different positions of the vehicle 51.

The overhead view image 61 around the vehicle 51 that is displayed on the navigation display 33 includes the combination of overhead view images 62 to 65. The overhead view image 62 is an image of the overhead view in front of the vehicle 51, the overhead view image 63 is an image of the overhead view on the left side of the vehicle 51, the overhead view image 64 is an image of the overhead view on the right side of the vehicle 51, and the overhead view image 65 is an image of the overhead view behind the vehicle 51.

The overhead view image 62 is generated based on an image taken by the imaging device 11-F, installed in the front of the vehicle 51 as illustrated in FIG. 5, for example. The overhead view image 63 is generated based on an image taken by the imaging device 11-SL as illustrated in FIG. 5, for example. The overhead view image 64 is generated based on an image taken by the imaging device 11-SR as illustrated in FIG. 5, for example. The overhead view image 65 is generated based on an image taken by the imaging device 11-R as illustrated in FIG. 5, for example.

Next, the configuration of each imaging device 11 is described with reference to FIG. 7.

Figure 7:
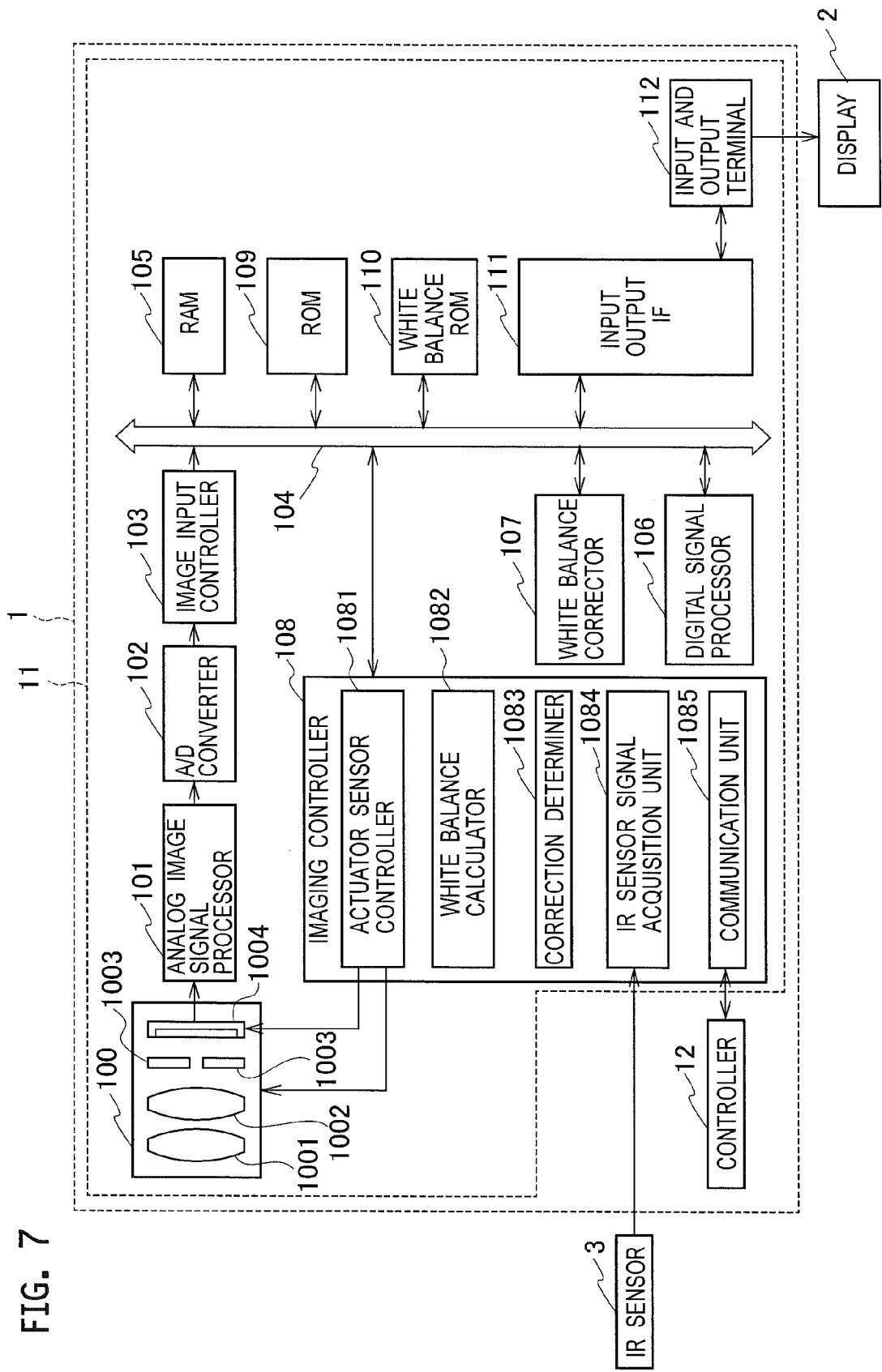
FIG. 7 is a diagram illustrating the configuration of the imaging devices.

Each imaging device 11 is configured as illustrated in FIG. 7. The imaging devices 11 have the same configuration in the system configuration as illustrated in FIG. 1. The configuration of the imaging devices 11 is described with one of the imaging devices 11.

In FIG. 7, the imaging device 11 includes an imaging unit 100 to capture a subject and obtain an analog image signal of the subject.

The imaging unit 100 includes a zoom lens 1001, a focus lens 1002, a diaphragm 1003, and an imaging device 1004 composed of an image sensor and the like.

The zoom lens 1001 moves along an optical axis by an unillustrated zoom actuator. The focus lens 1002 similarly moves along the optical axis by an unillustrated focus actuator. The diaphragm 1003 is driven by an unillustrated diaphragm actuator to operate.

The imaging process using the imaging unit 100 is performed in the following procedure. The imaging device 1004 performs photoelectric conversion for light having passed through the zoom lens 1001, the focus lens 1002, and the diaphragm 1003 to generate an analog image signal of the subject. The generated analog image signal is given to an analog image signal processor 101.

The analog image signal processor 101 amplifies the given analog image signal, and an A/D converter 102 converts the amplified image signal to digital image data. An image input controller 103 receives the digital image data given from the A/D converter 102 and stores the received digital image data in a RAM 105 via a bus 104. The RAM 105 is connected to the bus 104.

The bus 104 is connected to a digital signal processor 106, a white balance corrector 107, and an imaging controller 108.

Under control of the imaging controller 108, the digital signal processor 106 reads the digital image data stored in the RAM 105 via the bus 104, and performs predetermined signal processing for the digital image data to generate data composed of a luminance signal and a color difference signal.

The digital signal processor 106 performs various types of digital correction processing for the digital image data, for example the AGC gain or ISO sensitivity, based on sensitivity information which is obtained in the process of imaging the subject and is outputted from the imaging device 1004. The various types of digital correction processing include offset processing, gamma correction, gain processing, RGB compensation, noise reduction, contour correction, color compensation, and light source-type determination, for example.

AGC is the abbreviation of automatic gain control, and ISO is the abbreviation of international organization for standardization.

The white balance corrector 107 corrects the individual white balance value calculated by each imaging device 11 to the target white balance value based on the target white balance value and correction speed calculated by the later-described controller 12.

The imaging controller 108 reads a control program which is stored in a ROM 109 via the bus 104, and controls the entire operation of the imaging device 11. The imaging controller 108 controls the entire operation of the imaging device 11, overall based on the readout control program. The imaging controller 108 can be composed of a microcomputer including a CPU.

The imaging controller 108 includes an actuator and sensor controller 1081, a white balance calculator 1082, a correction determiner 1083, an IR sensor signal acquisition unit 1084, and a communication unit 1085.

The actuator and sensor controller 1081 control the drive of the above-described unillustrated zoom actuator, the focus actuator, and the diaphragm actuator of the imaging unit 100. The actuator and sensor controller 1081 control the photoelectric conversion operation of the imaging device 1004.

The white balance calculator 1082 measures the distributions of the R (red), G (green), and B (blue) values of color information of the digital image data, with reference to the digital image data stored in the RAM 105 via the bus 104. The white balance calculator 1082 measures the distributions of R, G, and B values of the digital image data by dividing the digital image data into plural regions, and calculating averages of R, G, and B values in each region to create histograms.

The white balance calculator 1082 performs a pattern-matching process to match the created histograms against histograms in a previously-prepared white balance calculation table. The white balance calculation table shows a correspondence relationship between histograms representing distributions of R, G, and B values, the white balance value, and the color temperature of images. The white balance calculation table is stored in a storage device such as the ROM 109, for example, to be prepared in advance.

As the result of the pattern-matching process, the white balance calculator 1082 determines the white balance value corresponding to the histogram, which is equal to or the closest to each created histogram as the white balance value for the digital image data. The calculated white balance value is the individual white balance value calculated for each imaging device 11.

The white balance calculator 1082 may be configured to calculate the color temperature of the digital image data instead of the white balance value, and to calculate the white balance value based on the color temperature. The white balance calculator 1082 may be configured to calculate both the white balance value and the color temperature.

The correspondence relationship between the white balance value and the color temperature depends on the characteristics of the lenses (the zoom and focus lenses 1001 and 1002), the imaging device 1004, the filters (not illustrated), and the like of the imaging unit 100. The correspondence relationship between the white balance value and the color temperature is specific to each imaging device 11, and is previously stored in a white balance ROM 110 of each imaging device 11 when the imaging device 11 is produced.

In the following description, the white balance calculator 1082 calculates only the individual white balance value based on the histograms, and the target white balance value is calculated based on the calculated individual white balance value, through various types of processing.

The correction determiner 1083 determines whether to start, continue, or terminate a process of correcting the individual white balance value, based on a notification of the starting or stopping of an engine, which is given from a unillustrated engine control unit (ECU) via the controller 12. The ECU is a device which performs overall control of electronically-controlled devices that control operation of the engine.

The correction determiner 1083 determines to start the correction process when being notified of the start of the engine by the ECU via the controller 12. The imaging controller 108 and the white balance corrector 107 thereby start the correction process. The correction determiner 1083 determines to terminate the correction process when being notified by the ECU via the controller 12 of the stopping of the engine. The imaging controller 108 and the white balance corrector 107 thereby terminate the correction process.

The correction determiner 1083 determines to continue the correction process until being notified by the ECU via the controller 12 of the start of the engine after the correction process is started. The imaging controller 108 and the white balance corrector 107 thereby continue the correction process.

The IR sensor signal acquisition unit 1084 acquires the IR sensor signal obtained by an IR (infrared ray) sensor 3. The IR sensor 3 converts the received infrared rays into an electric signal, and gives the electric signal obtained by the conversion to the IR sensor signal acquisition unit 1084 as the IR sensor signal. The IR sensor 3 is provided for the vehicle where the imaging devices 11 are mounted.

The IR sensor signal acquisition unit 1084 gives the acquired IR sensor signal to the controller 12 via the communication unit 1085. The IR sensor signal is used to determine the environment around the vehicle as described later.

The communication unit 1085 controls the input and output of information between the imaging device 11 and the controller 12, and communicates necessary information between the imaging device 11 and the controller 12 through wired or wireless connections.

The bus 104 is connected to an input and output terminal 112 via an input output I/F 111. The input and output terminal 112 is connected to the display 2.

Figure 8:
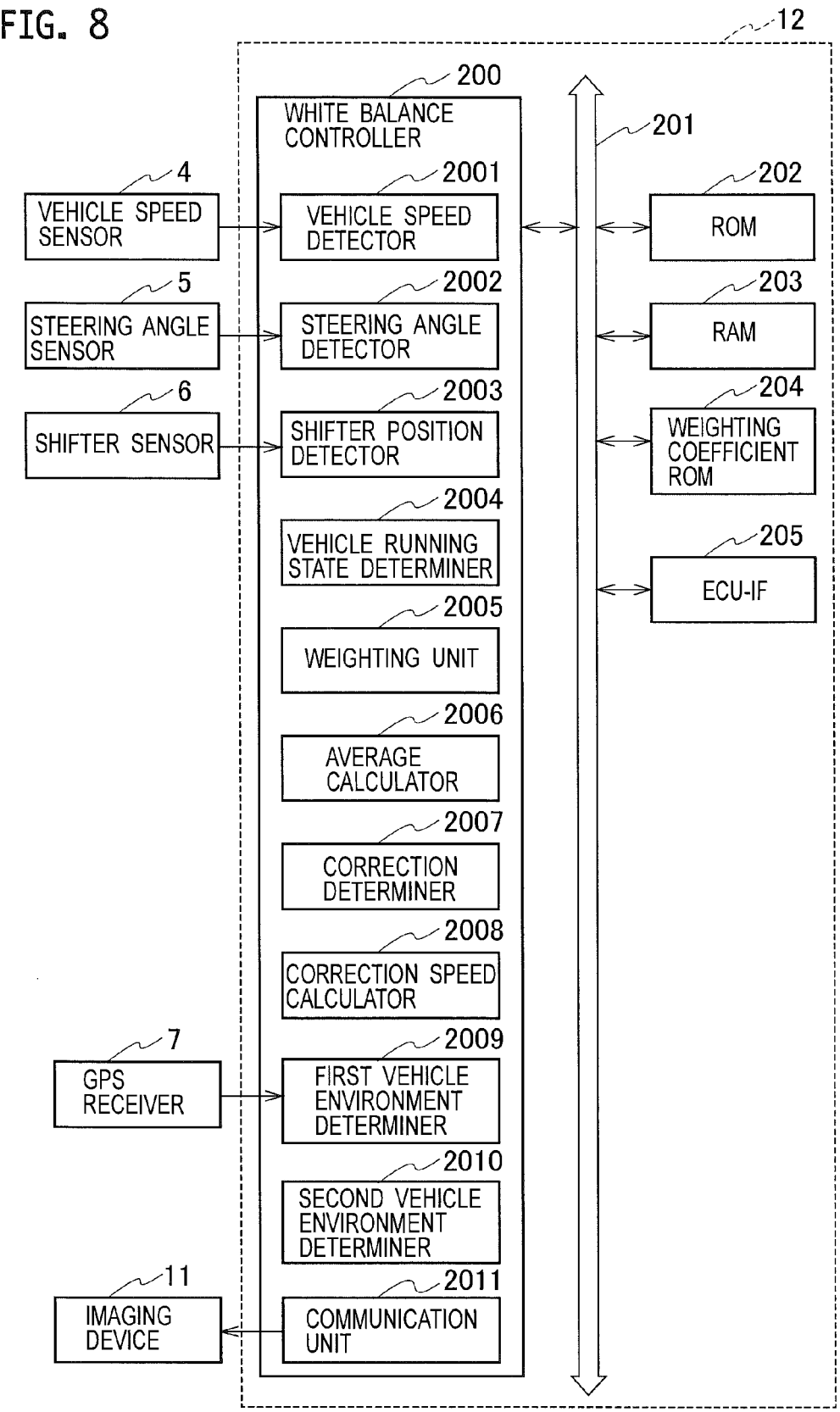
FIG. 8 is a diagram illustrating the configuration of a controller.

Next, a description is given of the configuration of the controller 12, with reference to FIG. 8.

The controller 12 is configured as illustrated in FIG. 8. In FIG. 8, the controller 12 includes a white balance controller 200.

The white balance controller 200 reads a control program that is stored in a ROM 202 via a bus 201, and controls the entire operation of the controller 12. Based on the readout control program, the white balance controller 200 performs overall control of the entire operation of the controller 12. The white balance controller 200 can be composed of a microcomputer including a CPU.

In addition to the white balance controller 200 and the ROM 202, the bus 201 is connected to a RAM 203, a weighting coefficient ROM 204, and an ECU-IF 205.

The white balance controller 200 executes various types of processing shown below by exchanging data via the bus 201, between the weighting coefficient ROM 204 and the RAM 203, storing data necessary to execute the various types of processing.

The white balance controller 200 includes a vehicle speed detector 2001, a steering angle detector 2002, a shifter position detector 2003, a vehicle running state determiner 2004, a weighting unit 2005, and an average calculator 2006.

The vehicle speed detector 2001 detects the vehicle speed based on the vehicle speed signal given from a vehicle speed sensor 4 provided for the vehicle. The vehicle speed signal is an electric signal corresponding to the vehicle speed given to the ECU and the like.

The steering angle detector 2002 detects the steering angle of the vehicle, based on steering angle signal given from a steering sensor 5 provided for the vehicle. The steering angle signal is an electric signal corresponding to the steering angle of the vehicle given to the ECU and the like.

The shifter position detector 2003 detects the position (the range) of the shifter, based on a shifter position signal given from a shifter sensor 6 provided for the vehicle. The shifter position signal is an electric signal indicating the position of the shifter given to the ECU and the like.

The shifter position signal is an electric signal indicating that the shifter is positioned in the D (drive) range to move the vehicle forward, or the R (reverse) range to move the vehicle rearward, for example. The shifter position signal is also an electric signal indicating that the shifter is positioned in the P (park) range.

The vehicle running state determiner 2004 determines the running state of the vehicle, based on the vehicle speed detected by the vehicle speed detector 2001, the steering angle detected by the steering angle detector 2002, and the shifter position detected by the shifter position detector 2003. The vehicle running state determiner 2004 also determines the running state of the vehicle, based on the duration for which the detected vehicle speed and steering angle have been maintained.

The vehicle running state determiner 2004 determines that the vehicle is moving forward when the shifter is positioned in the range to move the vehicle forward, the variation in vehicle speed is equal to or smaller than a predetermined value, and the above conditions have continued for a predetermined period or more. Alternatively, the vehicle running state determiner 2004 determines that the vehicle is moving forward when the shifter is positioned in the range to move the vehicle forward, the variation in vehicle speed is equal to or greater than a predetermined value, the variation in the steering angle is equal to or smaller than a predetermined value, and the above conditions have continued for a predetermined period or more. This running state is referred to as a forward movement state.

The vehicle running state determiner 2004 determines whether the forward movement state has continued for a first predetermined time. The vehicle running state determiner 2004 determines whether the forward movement state has continued for a second predetermined time. The second predetermined time is set longer than the first predetermined time.

The vehicle running state determiner 2004 determines that the vehicle is moving rearward when the shifter is positioned in the R range, the variation in vehicle speed is equal to or smaller than a predetermined value, and the above conditions have continued for a predetermined period or more. Alternatively, the vehicle running state determiner 2004 determines that the vehicle is moving rearward when the shifter is positioned in the R range, the variation in vehicle speed is equal to or greater than a predetermined value, the variation in steering angle is equal to or smaller than a predetermined value, and the above conditions have continued for a predetermined period. This running state is referred to as a rearward movement state.

The vehicle running state determiner 2004 determines whether the rearward movement state has continued for a third predetermined time. The vehicle running state determiner 2004 determines whether the rearward movement state has continued for a fourth predetermined time. The fourth predetermined time is set longer than the third predetermined time.

The vehicle running state determiner 2004 determines that the vehicle has started turning at an intersection or the like when the vehicle speed continues to decrease by a predetermined value or more and the variation in the turning angle is simultaneously or subsequently equal to or greater than a predetermined value. Herein, this running state is referred to as a turning state.

The vehicle running state determiner 2004 determines that the vehicle is turning in a curve or is changing lanes when the variation in vehicle speed is equal to or smaller than a predetermined value and the variation in the turning angle is equal to or smaller than a predetermined value. Herein, the running state is referred to as a transient changing state.

The vehicle running state determiner 2004 determines that the vehicle is being stopped when the shifter is positioned in the P range or when the vehicle speed is 0.

The weighting unit 2005 multiplies the individual white balance value given from each imaging device 11 by the corresponding weighting coefficient for weighting based on the running state of the vehicle, determined by the vehicle running state determiner 2004.

The weighting coefficients are properly set and prepared in advance and are stored in the weighting coefficient ROM 204. The weighting coefficients may be stored in another storage device such as the ROM 202, instead of the weighting coefficient ROM 204.

When the vehicle is in the forward movement state, the weighting coefficient for the white balance value of an image taken by the imaging device 11 installed in the front of the vehicle is set larger than the weighting coefficients for the white balance values of the images taken by the other imaging devices 11. When the vehicle is in the forward movement state, the weighting coefficient for the white balance value of an image taken by the imaging device 11 installed in the front of the vehicle increases with the duration when the vehicle is in the forward movement state. The upper limit of the increasing weighting coefficient is determined in advance.

The imaging device 11 is installed in a front bumper in the front of the vehicle, for example.

When the vehicle is in the rearward movement state, the weighting coefficient for the white balance value of an image taken by the imaging device 11 installed in the back of the vehicle is set larger than the weighting coefficients for white balance values of images taken by the other imaging devices 11. When the vehicle is in the rearward movement state, the weighting coefficient of the white balance value of an image taken by the imaging device 11 installed in the back of the vehicle increases with the duration for which the vehicle is in the rearward movement state. The upper limit of the increasing weighting coefficient is determined in advance.

The imaging device 11 is installed is a rear bumper or a back door in the back of the vehicle, for example.

When the vehicle is in the turning state or the stop state, the weighting coefficients are returned to the initial conditions. The weighting coefficients for the white balance values of all images taken by the imaging devices 11 are set equal to each other.

When the vehicle is in the transient changing state, the weighting coefficients are continuously maintained.

Figure 9:
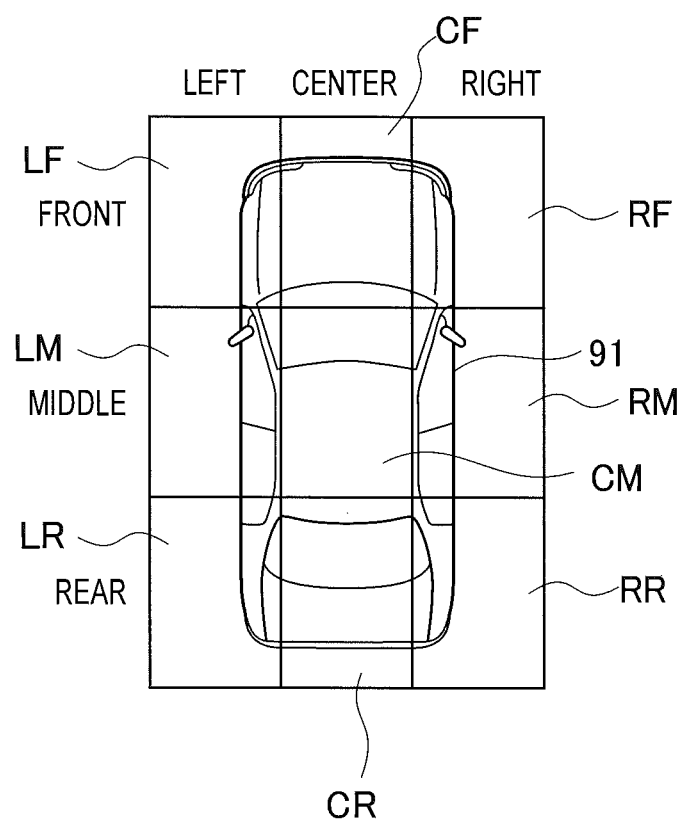
FIG. 9 is a diagram illustrating sections for installation places set to specify the installation place of each imaging device to be installed on a vehicle.

FIG. 9 is a diagram illustrating sections set to specify the installation place of each imaging device 11 installed in the vehicle.

In FIG. 9, the installation places of the imaging devices 11 are segmented into nine sections in the top view thereof, for example. Herein, the vehicle 91 is divided in the longitudinal direction of the vehicle 91 into three areas: the front, intermediate, and rear areas, and is divided in the lateral direction into three areas: the left, center, and right areas. In this case, the nine sections of installation places include: a left front section LF, a center front section CF, a right front section RF, a left middle section LM, a center middle section CM, a right middle section RM, a left rear section LR, a center rear section CR, and a right rear section RR.

The aforementioned sections for the installation places are shown as an example, and the number of sections and the way of segmentation can be determined properly.

The imaging devices 11 mounted on the vehicle 91 include at least the imaging device 11 to take an image of the forward view from the vehicle 91, and the imaging device 11 to take an image of the rearward view from the vehicle 91. The imaging device 11 to take an image of the forward view from the vehicle is installed in one of the left front section LF, the center front section CF, the right front section RF, and the center middle section CM in the segmentation example as illustrated in FIG. 9, for example. The imaging device 11 to take an image of the rearward view from the vehicle is installed in one of the left rear section LR, the center rear section CR, the right rear section RR, and the center middle section CM in the segmentation example as illustrated in FIG. 9, for example.

The imaging device 11 to take an image of the left-hand view from the vehicle is installed in any one of the left front section LF, the left middle section LM, and the left rear section LR in the segmentation example as illustrated in FIG. 9, for example.

The imaging device 11 to capture an image of the right-hand view from the vehicle is installed in any one of the right front section RF, the right middle section RM, and the right rear section RR in the segmentation example as illustrated in FIG. 9, for example.

FIGS. 10A to 10D are tables each illustrating an example of specific numeral values of weighting coefficients for the white balance values of images taken by the imaging devices 11, installed in the respective nine sections as illustrated in FIG. 9.

In FIG. 10, when the weighting coefficients are the same in the initial state, the weighting coefficients of all the imaging devices 11 are set to 1 as illustrated in FIG. 10A.

When the vehicle is determined to be in the forward movement state, the weighting coefficients of the imaging devices 11, installed in the nine sections are configured as follows.

Right after the vehicle is determined to be in the forward movement state, as illustrated in FIG. 10B, the weighting coefficient of the imaging device 11 installed in the center front section CF is set to 3. The weighting coefficients of the imaging devices 11, installed in the left front section LF, the right front section RF, and the center middle section CM are set to 2. The weighting coefficients of the imaging devices 11, installed in the left middle section LM, the right middle section RM, the left rear section LR, the center rear section CR, and the right rear section RR are set to 1.

When the vehicle is determined to be in the forward movement state and the forward movement state has continued for the first predetermined period described above, as illustrated in FIG. 10C, the weighting coefficient of the imaging device 11, installed in the center front section CF, is increased from 3 to 4. The weighting coefficients of the other imaging devices 11 are not changed.

When the vehicle is determined to be in the forward movement state and the forward movement state has continued for the second predetermined period beyond the first predetermined period, as illustrated in FIG. 10D, the weighting coefficients of the imaging devices 11 are set as follows. The weighting coefficient of the imaging device 11, installed in the center middle section CM, is increased from 4 to 8. The weighting coefficients of the imaging devices 11, installed in the left front section LF, the right front section RF, and the center middle section CM are increased from 2 to 4. The weighting coefficients of the imaging devices 11, installed in the left middle section LM and the right middle section RM are increased from 1 to 2. The weighting coefficients of the other imaging devices 11 are not changed.

On the other hand, when the vehicle is determined to be in the rearward movement state, the weighting coefficients of the imaging devices 11, installed in the nine sections, are the inversion of those in the case where the vehicle is in the forward movement state (not illustrated).

To be specific, the weighting coefficients of the imaging devices 11, installed in the nine sections, are set as follows after the vehicle is determined to be in the rearward movement state.

Right after the vehicle is determined to be in the rearward movement state, the weighting coefficient of the imaging device 11, installed in the center rear section CR, is set to 3. The weighting coefficients of the imaging devices 11, installed in the left rear section LR, the right rear section RR, and the center middle section CM are set to 2. The weighting coefficients of the imaging devices 11, installed in the left middle section LM, the right middle section RM, the left front section LF, the center front section CF, and the right front section RF are set to 1.

When the vehicle is determined to be in the rearward movement state and the rearward movement state has continued for the above-described first predetermined period, the weighting coefficients of the imaging devices 11, installed in the center middle section CM, is increased from 3 to 4. The weighting coefficients of the other imaging devices 11 are not changed.

When the vehicle is determined to be in the rearward movement state and the rearward movement state has continued for the second predetermined period beyond the first predetermined period, the weighting coefficients of the imaging devices 11 are set as follows. The weighting coefficient of the imaging device 11, installed in the center rear section CR, is increased from 4 to 8. The weighting coefficients of the imaging devices 11, installed in the left rear section LR, the right rear section RR, and the center middle section CM are increased from 2 to 4. The weighting coefficients of the imaging devices 11, installed in the left middle section LM and the right middle section RM are increased from 1 to 2. The weighting coefficients of the other imaging devices 11 are not changed.

Right after the vehicle is determined to be in the turning state or the stop state, the weighting coefficients of all the imaging devices 11 are returned to 1 of the initial state.

Returning to FIG. 8, the average calculator 2006 calculates the average of the individual white balance values of the imaging devices 11 that are weighted by the weighting unit 2005. The average calculator 2006 calculates the average by dividing the total sum of the weighted individual white balance values by the total number of the imaging devices 11.

The calculated average of white balance values is the target white balance value described above, and is common to all the imaging devices 11. The calculated average of the white balance values is given as the target white balance value, to a later-described communication unit 2011 and the white balance corrector 107 of each imaging device 11 via the communication unit 1085 of the imaging device 11.

FIGS. 11A to 11D are diagrams illustrating examples of changes in color temperature which is obtained by weighting the color temperature of an image taken by each imaging device 11 using the weighting coefficients illustrated in FIG. 10. The vertical axis represents the color temperature, and the horizontal axis represents the elapsed time with which the color temperature changes. The changes in color temperature as illustrated in FIG. 11 represent changes in the white balance value, since the color temperature has a value corresponding to the white balance value as described above.

In FIG. 11, color temperature TCF indicates the color temperature of an image taken by the imaging device 11, installed at a place in the center front section CF as illustrated in FIG. 9. Color temperature TLM indicates the color temperature of an image taken by the imaging device 11, installed at a place in the left middle section LM as illustrated in FIG. 9. Color temperature TRM indicates the color temperature of an image taken by the imaging device 11 installed at a place in the right middle section RM as illustrated in FIG. 9. Color temperature TCR indicates the color temperature of an image taken by the imaging device 11, installed at a place in the center rear section CR as illustrated in FIG. 9.

Color temperature TT is an average of the color temperatures of images taken by the imaging devices 11. The changes in the color temperature TT as illustrated in FIG. 11 accordingly represents changes in the average of the white balance values calculated by the average calculator 2006, that is, the target white balance value.

Figure 11A:
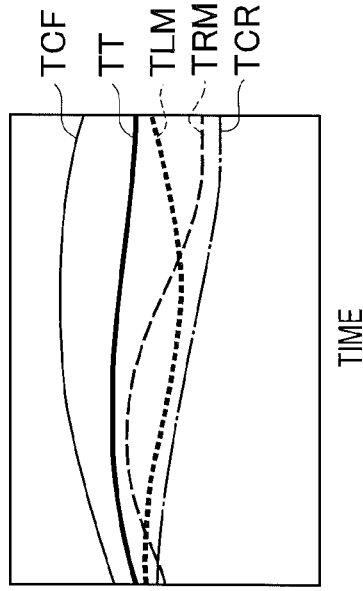
FIGS. 11A-11D illustrate diagrams showing examples of changes in the color temperature of images taken by the imaging devices using the weighting coefficients as a parameter.
Figure 11B:
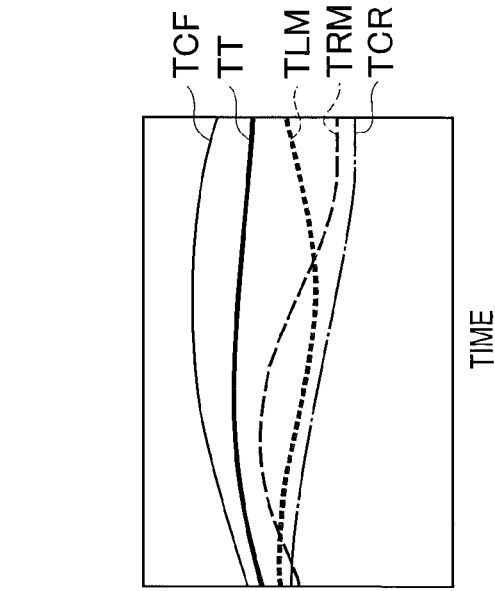
Figure 11C:
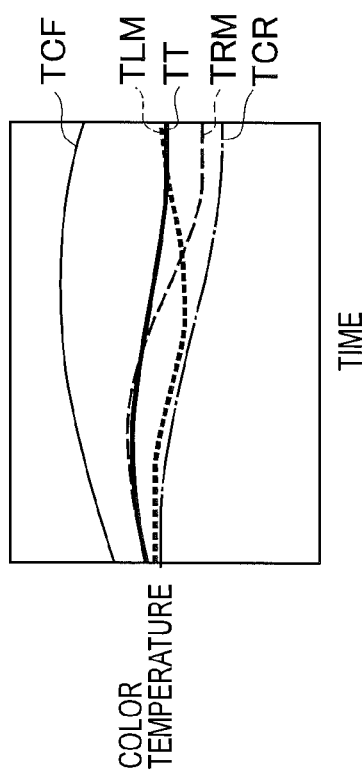
Figure 11D:
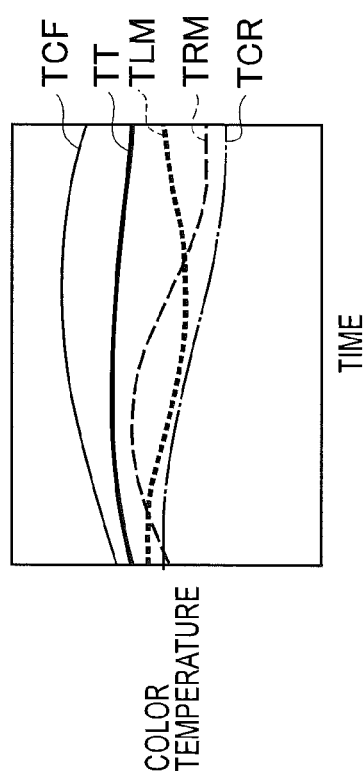

FIG. 11A illustrates the case where the weighting coefficients illustrated in FIG. 10A are applied to the color temperature of the image taken by each imaging device 11. FIG. 11B illustrates the case where the weighting coefficients illustrated in FIG. 10B are applied. FIG. 11C illustrates the case where the weighting coefficients illustrated in FIG. 10C are applied. FIG. 11D illustrates the case where the weighting coefficients illustrated in FIG. 10D are applied.

As apparent from FIG. 11, when the vehicle continues to be in the forward movement state without changing in the running state, the average of the color temperature TT comes close to the color temperature of an image taken by the imaging device 11, installed in the center front section CF with time. When the vehicle is in the rearward movement state (not illustrated), the average of the color temperature TT comes close to the color temperature of an image taken by the imaging device 11, installed in the center rear section CR with time.

In the calculation of the target white balance value, the weight for the individual white balance value of an image taken in the vehicle travel direction, in which the vehicle's driver is gazing, increases. In other words, when the running state of the vehicle does not change, the weighting coefficients are configured so that the weight for the individual white balance value of an image taken in the vehicle's travel direction increase with time.

Returning to FIG. 8, the white balance controller 200 includes a correction determiner 2007, a correction speed calculator 2008, a first vehicle environment determiner 2009, a second vehicle environment determiner 2010, and the communication unit 2011.

The correction determiner 2007 determines whether to correct the individual white balance value of each imaging device 11 to the target white balance value.

The environment around the running vehicle often changes with movement of the vehicle. It is therefore thought that the white balance value of an image of a subject taken by each imaging device 11 is likely to change with the movement of the vehicle. If the white balance value of an image taken by each imaging device 11 is corrected by strictly following the changing white balance values, the white balance value may change significantly. In this case, the image with a significantly changing white balance value may give the viewer an uncomfortable feeling.

To avoid the aforementioned problem, the correction determiner 2007 corrects the white balance value when the target white balance value calculated in a predetermined period is within a predetermined range, and is determined to be stable. On the other hand, the correction determiner 2007 maintains the white balance value if the target white balance value calculated in the predetermined period is out of the predetermined range, and is determined to be unstable.

The white balance value is thought to be more likely to change right after the vehicle goes indoors or outdoors, or moves into or out of a tunnel. Right after the vehicle goes indoors or outdoors or moves into or out of a tunnel, the correction determiner 2007 therefore corrects the white balance value without determining whether the target white balance value is stable.

The correction determiner 2007 determines whether to start, continue, or terminate the process of correcting the white balance values based on the notification of the starting or stopping of the engine, which is given from an unillustrated ECU via the ECU-IF 205 (described later).

The correction determiner 2007 determines to start the correction process when being notified of the start of the engine from the ECU via the ECU-IF 205. The controller 12 thereby starts the correction process. The correction determiner 2007 determines to terminate the correction process when being notified of the engine stopping from the ECU via the ECU-IF 205. The controller 12 thereby terminates the correction process. The correction determiner 2007 determines to continue the correction process until being notified of the engine stopping from the ECU via the ECU-IF 205 after the correction process is started. The controller 12 thereby continues the correction process.

The correction speed calculator 2008 calculates the correction speed at which each imaging device 11 corrects the individual white balance value to the target white balance value. The imaging devices 11 vary in correction time taken to correct the white balance value, due to manufacturing process variations. The individual white balance values of the imaging devices 11 are different from each other, and the difference between the individual and target white balance values of each imaging device 11 is therefore different.

The time taken for each imaging device 11 to complete the correction process of the individual white balance value to the target white balance value is therefore different. In the process of properly combining and displaying images of the imaging devices 11 with the white balance values corrected to the target white balance value, the white balance values of some of the images may be corrected quickly, while the white balance values of others may be corrected slowly. This displayed image may give the viewer an uncomfortable feeling.

The correction speed calculator 2008 calculates the correction speed so that the process of correcting the white balance value is completed within the target correction time which is common to each imaging device 11. The correction speed calculator 2008 calculates the correction speed of each imaging device 11, so that the individual white balance value of each imaging device 11 is corrected to the target white balance value at the same time. The correction speed calculator 2008 calculates the correction speed in accordance with the following procedure.

The correction speed calculator 2008 acquires the individual white balance value of each imaging device 11 via the communication units 1085 and 2011. The correction speed calculator 2008 calculates the difference between the acquired individual white balance value and the target white balance value. The correction speed calculator 2008 divides the calculated difference between the individual white balance value and the target white balance value by the target correction time to calculate the correction speed.

The calculated correction speed is given to the white balance corrector 107 of each imaging device 11 via the communication units 1085 and 2011.

The first vehicle environment determiner 2009 specifies the current position of the vehicle, based on information received from a GPS satellite by a GPS (global positioning system) receiver 7 mounted on the vehicle. The first vehicle environment determiner 2009 matches the current position of the vehicle against map data provided for the first vehicle environment determiner 2009, to determine whether the vehicle has gone indoors or outdoors, or has moved into or out of a tunnel.

The second vehicle environment determiner 2010 determines whether the vehicle has gone indoors or outdoors or has moved into or out of a tunnel based on the IR sensor signal, acquired by the above-described IR sensor 3 and given from each imaging device 11. The amount of infrared light outdoors is different from the amount indoors, and the amount of infrared light in a tunnel is different from the amount outside of a tunnel. The second vehicle environment determiner 2010 calculates a change in the amount of infrared light when the vehicle goes outdoors or indoors, or moves into or out of a tunnel based on the IR sensor signal. The second vehicle environment determiner 2010 determines whether the vehicle has gone outdoors or indoors, or whether the vehicle has moved into or out of a tunnel based on the calculated change in the amount of infrared light.

When any one of or both of the first and second vehicle environment determiners 2009 and 2010 determine that the vehicle has gone outdoors or indoors or that the vehicle has moved into or out of a tunnel, the vehicle is determined to have gone outdoors or indoors, or moved into or out of a tunnel.

The white balance controller 200 may be configured to determine whether the vehicle has gone outdoors or indoors or moved into or out of a tunnel by including any one of the first and second vehicle environment determiners 2009 and 2010.

The communication unit 2011 controls inputs and outputs of information to and from the imaging devices 11 and controller 12, and communicates necessary information through wireless or wired connections between the imaging controller 108 of each imaging device 11, and the white balance controller 200 of the controller 12.

The ECU-IF 205 performs wireless and wired communication between the white balance controller 200 and ECU, and receives a signal indicating the starting or stopping of the engine from the ECU, serving as an instruction to start or terminate the process of correcting the white balance value.

Figure 12:
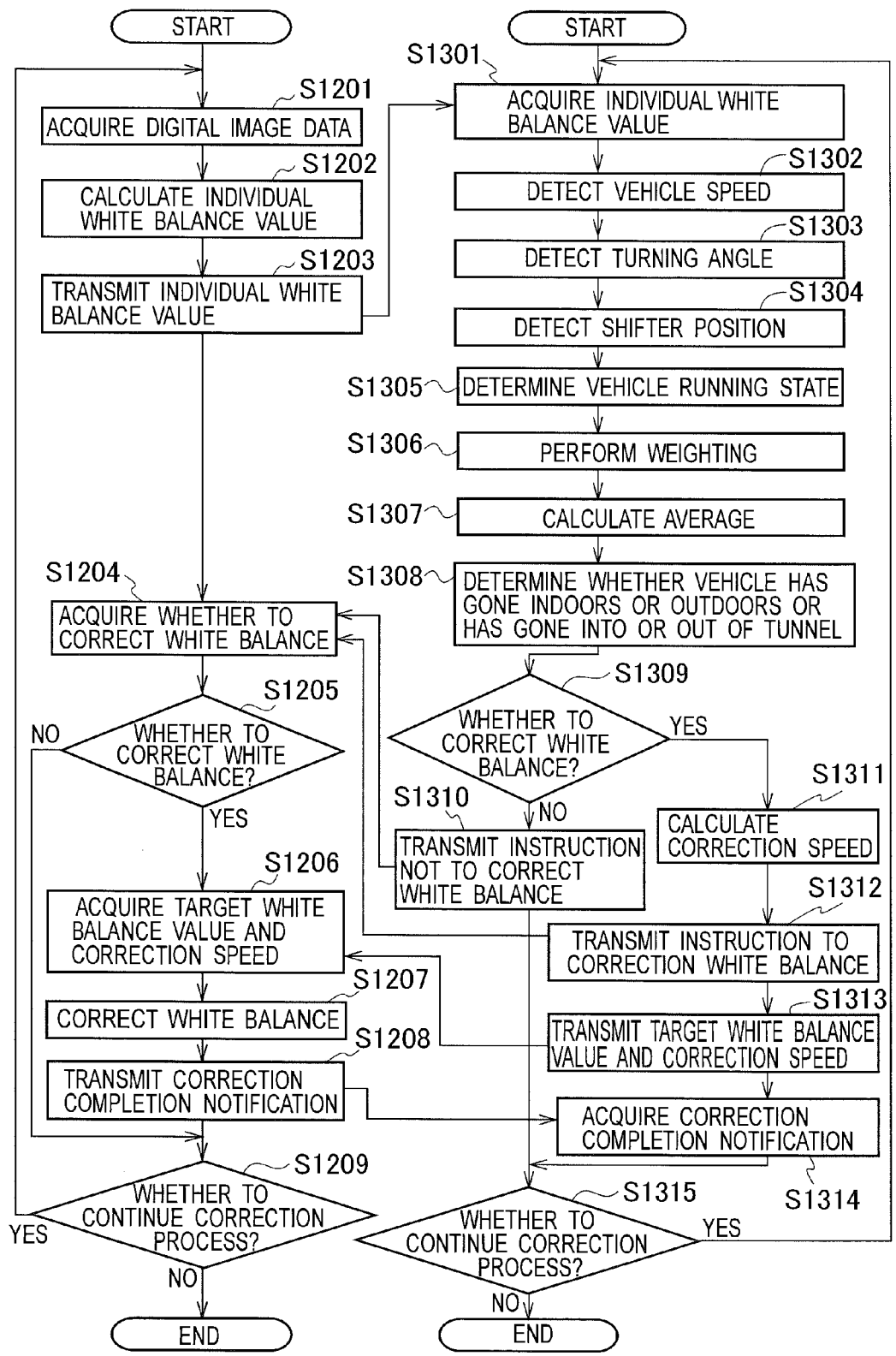
FIG. 12 is a flowchart illustrating a procedure of an operation process according to the embodiment.

FIG. 12 is a flowchart illustrating the procedure of the process of correcting each individual white balance value to the target white balance value subsequent to the start thereof.

In FIG. 12, the processing indicated by steps S1201 to S1209 is executed by each imaging device 11, and the processing indicated by steps S1301 to S1315 is executed by the controller 12.

First, the processing executed by each imaging device 11 is described.

The imaging unit 100, the analog image signal processor 101, the A/D converter 102, and the image input controller 103 execute the following processing in step S1201 to acquire digital image data of a subject.

The imaging unit 100 images the subject and generates an analog image signal of the subject. The analog image signal processor 101 amplifies the generated analog image signal. The A/D converter 102 converts the amplified signal to the digital image data. The image input controller 103 receives the digital image data and stores the received digital image data in the RAM 105 via the bus 104.

In step S1202, the white balance calculator 1082 creates histograms of R, G, and B values of the acquired digital image data and calculates the individual white balance value of the acquired digital image data based on the created histograms.

In step S1203, the communication unit 1085 transmits the calculated individual white balance value to the controller 12.

Next, the procedure proceeds to processing executed in the controller 12. A series of processing steps executed in the controller 12 is described.

In step S1301, the communication unit 2011 of the controller 12 receives and acquires the individual white balance value of each imaging device 11 transmitted from the communication unit 1085 of the imaging device 11.

In step S1302, the vehicle detector 2001 acquires the vehicle speed signal from the vehicle speed sensor 4, and detects the vehicle speed based on the acquired vehicle speed signal.

In step S1303, the steering angle detector 2002 acquires the steering angle signal from the steering angle sensor 5, and detects the steering angle based on the acquired steering angle signal.

In step S1304, the shifter position detector 2003 acquires the shifter position signal from the shifter sensor 6 and detects the position of the shifter based on the acquired shifter position signal.

In step S1305, based on the detected vehicle speed, steering angle, and shifter's position, the vehicle running state determiner 2004 determines whether the running state of the vehicle is the stop, forward movement, rearward movement, turning, or transient changing state. The vehicle running state determiner 2004 also determines the duration for which the forward or rearward movement state has continued in step S1305.

In step S1306, the weighting unit 2005 refers to the weighting coefficients stored in the weighting coefficient ROM 204 based on the running state of the vehicle, and multiplies the individual white balance value given from each imaging device 11 by the corresponding weighting coefficient for weighting.

In step S1307, the average calculator 2006 calculates the average of the weighted individual white balance values of the imaging devices 11 and sets the target white balance value to the calculated average.

In step S1308, the first vehicle environment determiner 2009 determines whether the vehicle has gone indoors or outdoors or has moved into or out of a tunnel, based on the information from the GPS satellite and map data. The second vehicle environment determiner 2010 determines whether the vehicle has gone indoors or outdoors or has moved into or out of a tunnel, based on the IR sensor signal in step S1308.

In step S1309, the correction determiner 2007 determines whether to correct the individual white balance value of each imaging device 11 to the target white balance value. When the correction determiner 2007 determines not to correct the individual white balance value (NO) as the result, the processing shown in step S1310 is executed.

In step S1310, the communication unit 2011 of the controller 12 transmits the result of determination to each imaging device 11 not to correct the individual white balance value to the target white balance value. The processing shown in step S1315 is then executed.

When the correction determiner 2007 determines to correct the individual white balance value (YES) as the result of the determination process shown in step S1309, in step S1311, the correction speed calculator 2008 calculates the correction speed at which each imaging device 11 corrects the individual white balance value to the target white balance value.

In step S1312, the communication unit 2011 of the controller 12 transmits the result of determination to each imaging device 11 to correct the individual white balance value to the target white balance value. Thereafter in step S1313, the communication unit 2011 of the controller 12 transmits the calculated target white balance value and correction speed to each imaging device 11.

Next, the procedure proceeds to the processing executed in each imaging device 11. The processing steps executed in each imaging device 11 are described.

In step S1204, the communication unit 1085 of the imaging device 11 receives and acquires the result of determination whether to correct the white balance value that is transmitted from the communication unit 2011 of the controller 12.

In step S1205, the white balance corrector 107 decides whether or not to correct the white balance value, based on the acquired result of determination. To be specific, when acquiring the result of determination not to correct the white balance value (NO), the white balance corrector 107 does not correct the white balance value. Thereafter, the processing shown in step S1209 is executed.

When acquiring the result of determination to correct the white balance value (YES), the processing shown in step S1206 is executed. Thereafter, the white balance corrector 107 corrects the white balance value.

In step S1206, the communication unit 1085 receives and acquires the target white balance value and correction speed, which are transmitted from the communication unit 2011 of the controller 12 in the processing as shown in step S1311.

In step S1207, the white balance corrector 107 corrects the individual white balance value to the target white balance value in accordance with the correction speed, calculated for each imaging device 11.

In step S1208, the white balance corrector 107 transmits a notification that the correction of the white balance value is completed to the controller 12 via the communication unit 1085. Thereafter, the processing shown in step S1209 is executed.

In step S1209, the correction determiner 1083 determines whether or not to continue or terminate the process of correcting the white balance value based on the notification of the starting or stopping of the engine. When the correction determiner 1083 determines to continue the correction process (YES), the processing shown in step S1201 is executed. On the other hand, when the correction determiner 1083 determines not to continue the correction process (NO), the series of processing steps executed in each imaging device 11 are terminated.

Next, the procedure proceeds to the processing executed in the controller 12. The processing steps executed in the controller 12 are described.

In step S1314, the communication unit 2011 receives and acquires a notification from each imaging device 11 that the correction of the white balance value is complete.

In step S1315, the correction determiner 2007 determines whether to continue or terminate the process of correcting the white balance value based on the notification of the starting or stopping of the engine. As a result of determination, when the correction determiner 2007 determines to continue the correction process (YES), the processing shown in S1301 is executed. On the other hand, when the correction determiner 2007 determines to terminate the correction process (NO), the series of processing steps executed in the controller 12 are terminated.

By executing the aforementioned procedure, the individual white balance value of each imaging device 11 is corrected to the target white balance value.

The aforementioned various types of predetermined values, times, and ranges are within the range of design variation, which can be determined by experiments with actual vehicles, desk analyses such as simulation or the like, and can be properly configured according to the processing executed with reference to the predetermined values and times.

As described above, the imaging system 1 provides the following effects by including the technical features shown below.

The imaging system 1 includes the plural imaging devices 11, which are mounted on the same moving body and image subjects to acquire images; and the controller 12 calculating the common target white balance value for the images acquired by the imaging devices 11.

Each imaging device 11 includes the white balance calculator 1082, which calculates the individual white balance value of an image acquired by the imaging device 11. Each imaging device 11 includes the white balance corrector 107 which, based on the target white balance value, corrects the individual white balance value of an image of the subject taken by the imaging device 11 to the target white balance value.

The controller 12 includes the weighting unit 2005, which individually weights the individual white balance value given from each imaging device 11 based on the weighting coefficients set for the respective imaging devices 11. The controller 12 includes the average calculator 2006, which calculates the average of the weighted individual white balance values, and sets the target white balance value to the calculated average.

By employing the aforementioned technical features, the imaging system 1 calculates the target white balance value common to the imaging devices 11, considering the characteristics of each imaging device 11 compared with the case where the white balance values of the plural imaging devices 11 are simply averaged as conventional.

The white balance values of plural images taken by the imaging devices 11 can be optimally standardized. When displaying the plural images taken by the imaging devices 11 on the one display 2, the imaging system 1 is capable of presenting images with the optimized white balance value to the viewer.

The controller 12 includes the correction speed calculator 2008, which individually calculates the correction speed at which each imaging device 11 corrects the individual white balance value to the target white balance value, so that the individual white balance values are simultaneously corrected to the target white balance value. The white balance corrector 107 corrects the individual white balance values of the images of subjects taken by the imaging devices 11 based on the correction speed calculated by the correction speed calculator 2008.

By employing the aforementioned technical feature, the imaging system 1 is capable of correcting the individual white balance values of the imaging devices 11 to the target white balance value at the same time. When displaying the plural images taken by the imaging devices 11 in the one display 2, the aforementioned technical feature prevents images corrected to the target white balance value and images not yet corrected from being displayed together. The imaging system 1 can present images to the viewer without giving an uncomfortable feeling.

The controller 12 includes the correction determiner 2007, which determines to correct the individual white balance values to the target white balance value when the target white balance value calculated in a predetermined period is within a predetermined range.

By employing the aforementioned technical features, the imaging system 1 prevents the target white balance value from varying significantly. The imaging system 1 is capable of presenting images corrected to the target white balance value to the viewer without giving an uncomfortable feeling.

Each imaging device 11 is mounted on the vehicle, and the weighting unit 2005 changes the weighting coefficients depending on the running state of the vehicle.

By employing the aforementioned technical features, the imaging system 1 changes the weight for the individual white balance value of each imaging device 11 in accordance with the running state of the vehicle, such as the state of the vehicle moving forward or moving rearward. The target white balance value can be therefore calculated in accordance with the running state of the vehicle.

When calculating the target white balance values, the imaging system 1 can increase the proportion of the individual white balance value of the imaging device 11 taking an image in the travel direction of the vehicle in the target white balance value. When the vehicle moves forward, for example, the imaging system 1 makes the weight higher for the individual white balance value of an image of the forward view from the vehicle than that of the individual white balances of images other than the image of the forward view from the vehicle.

The imaging system 1 therefore presents images corrected with the target white balance value, including a high proportion of the individual white balance value of the image in the travel direction of the vehicle and in the direction that the vehicle's driver is gazing.

When displaying plural images taken by the imaging devices 11 in the one display 2, the imaging system 1 can present images with the target white balance value close to the white balance value of the image of the actual landscape in the travel direction of the vehicle and in the direction the vehicle's driver is gazing.

The imaging system 1 therefore presents images that are corrected to the target white balance value without giving an uncomfortable feeling to the vehicle's driver seeing the corrected images.

The weighting unit 2005 changes the weighting coefficient based on the time for which the running state of the vehicle has continued.

By employing the aforementioned technical features, the imaging system 1 increases the weighting coefficient of each imaging device 11 with the time of how long the current running state of the vehicle has continued. The imaging system 1 therefore calculates the target white balance value considering the duration of the running state of the vehicle.

As a result, the imaging system 1 presents images corrected with the target white balance value, including a high proportion of the individual white balance value of the image in the travel direction of the vehicle and in the direction the vehicle's driver is gazing.

Similarly as described above, the imaging system 1 therefore presents images that are corrected to the target white balance value without giving an uncomfortable feeling to the vehicle's driver seeing the corrected images.

Each component illustrated in FIGS. 7 and 8 may be composed of hardware, and the portions which can be composed of software may be composed of software. Hardware and software may be used in the imaging system 1 arbitrarily. The hardware may be an integrated circuit.

As described above, in accordance with the imaging system 1 according to the embodiments, it is possible to optimally equalize and correct the white balance of the images of subjects taken by plural imaging cameras installed on a moving body.

The embodiments are applicable to any moving body that uses plural imaging devices to capture images of subjects in the plural directions.

What is claimed is:

1. An imaging system, comprising:
   a plurality of imaging devices which are mounted on a same moving body, and configured to capture subjects to acquire images; and
   a controller configured to calculate a common target white balance value to the images acquired by the imaging devices, wherein
   each of the plurality of imaging devices comprises:
   a white balance calculator configured to calculate an individual white balance value of an image acquired by the imaging device; and
   a white balance corrector configured to correct the individual white balance value of the image of the subject taken by the imaging device to the target white balance value, and
   the controller comprises:
   a weighting unit configured to individually weight the individual white balance value given from each of the plurality of imaging devices, based on a weighting coefficient set for each of the plurality of imaging devices, and
   an average calculator configured to calculate the average of the weighted individual white balance values, and to set the target white balance value to the calculated average,
   wherein
   the controller includes a correction speed calculator configured to calculate a correction speed of each imaging device at which the imaging device corrects the individual white balance value to the target white balance value, so that all the individual white balance values are corrected to the target white balance value at the same time, and the white balance corrector is configured to correct the individual white balance value of the image of the subject taken by the imaging device to the target white balance value based on the correction speed calculated by the correction speed calculator.

2. The imaging system according to claim 1, wherein the controller includes a correction determiner configured to determine to correct the individual white balance values to the target white balance value, when the target white balance value calculated in a predetermined period is within a predetermined range.

3. The imaging system according to claim 1, wherein
the plurality of imaging devices are mounted on a vehicle, and
the weighting unit is configured to change the weighting coefficients in accordance with the running state of the vehicle.

4. The imaging system according to claim 3, wherein the weighting unit is configured to change the weighting coefficients based on time for which the running state of the vehicle has continued.

5. An imaging system, comprising:
a plurality of imaging devices which are mounted on a same moving body, and configured to capture subjects to acquire images; and
a controller configured to calculate a common target white balance value to the images acquired by the imaging devices, wherein each of the plurality of imaging devices comprises:
a white balance calculator configured to calculate an individual white balance value of an image acquired by the imaging device; and
a white balance corrector configured to correct the individual white balance value of the image of the subject taken by the imaging device to the target white balance value, and the controller comprises:
a weighting unit configured to individually weight the individual white balance value given from each of the plurality of imaging devices, based on a weighting coefficient set for each of the plurality of imaging devices, and
an average calculator configured to calculate the average of the weighted individual white balance values, and to set the target white balance value to the calculated average, wherein the controller includes a correction determiner configured to determine to correct the individual white balance values to the target white balance value, when the target white balance value calculated in a predetermined period is within a predetermined range.

* * * * *